US012596425B2

(12) United States Patent
Hsieh et al.

(10) Patent No.: US 12,596,425 B2
(45) Date of Patent: Apr. 7, 2026

(54) APPARATUS AND METHOD FOR OPERATING CENTRAL-PROCESSING UNITS IN SLEEP MODE

(71) Applicant: MEDIATEK INC., Hsinchu City (TW)

(72) Inventors: Meng-Ju Hsieh, Hsinchu City (TW); Jr-Ling Guo, Hsinchu City (TW); Chien-Hao Chiang, Hsinchu City (TW); Hung-Lin Chou, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 90 days.

(21) Appl. No.: 18/604,681

(22) Filed: Mar. 14, 2024

(65) Prior Publication Data

US 2024/0310898 A1    Sep. 19, 2024

Related U.S. Application Data

(60) Provisional application No. 63/490,535, filed on Mar. 16, 2023.

(51) Int. Cl.
*G06F 1/3228* (2019.01)
*G06F 1/329* (2019.01)
(52) U.S. Cl.
CPC ............ *G06F 1/329* (2013.01); *G06F 1/3228* (2013.01)

(58) Field of Classification Search
None
See application file for complete search history.

(56) References Cited

U.S. PATENT DOCUMENTS

| | | | |
|---|---|---|---|
| 8,180,997 B2 * | 5/2012 | Burger | G06F 15/7867 712/15 |
| 2009/0031156 A1 * | 1/2009 | Barth | G06F 1/3203 713/323 |
| 2015/0198991 A1 * | 7/2015 | Bircher | G06F 1/329 713/323 |
| 2020/0326766 A1 * | 10/2020 | Tsirkin | G06F 9/4893 |
| 2021/0318740 A1 * | 10/2021 | Sripada | G06F 1/3243 |

* cited by examiner

*Primary Examiner* — Paul Yen
(74) *Attorney, Agent, or Firm* — McClure, Qualey & Rodack, LLP

(57) ABSTRACT

An apparatus includes a plurality of CPUs, a CPU scheduler, an idle predictor, and a CPU-idle framework. The CPUs are categorized into a first group and a second group, and a specific CPU is in the first group. When the specific CPU is idle, the CPU scheduler executes an idle task. The idle predictor determines whether the CPUs in the first group corresponding to the specific CPU are going to operate the sleep mode in response to the idle task so as to schedule a sleep schedule of the CPUs in the first group operating in the sleep mode. The CPU-idle framework commands the CPUs in the first group to operate in the sleep mode based on the sleep schedule.

14 Claims, 4 Drawing Sheets

400

Start

When the specific CPU is idle, issuing an idle task — S410

Determining a decision whether the CPUs in the first group are going to operate in the sleep mode based on the idle task — S420

Scheduling a sleep schedule of the CPUs in the first group operating in the sleep mode in response to the decision — S430

Operating the CPUs in the first group in the sleep mode based on the sleep schedule in response to the idle task — S440

End

100

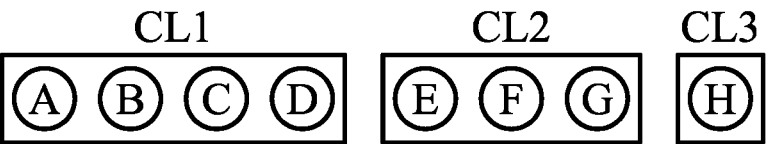
FIG. 3A
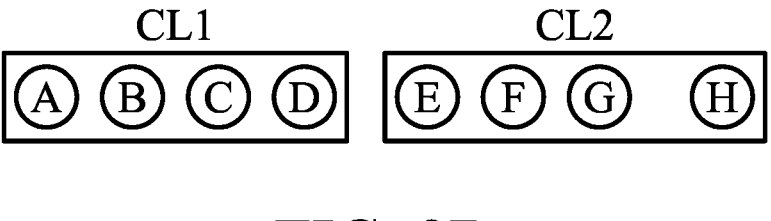
FIG. 3B
CL1 CL2 CL3
FIG. 3C

400

APPARATUS AND METHOD FOR OPERATING CENTRAL-PROCESSING UNITS IN SLEEP MODE

CROSS REFERENCE TO RELATED APPLICATIONS

This application claims the benefit of U.S. Provisional Application No. 63/490,535, filed on Mar. 16, 2023, the entirety of which is incorporated by reference herein.

BACKGROUND OF THE INVENTION

Field of the Invention

The disclosure is generally related to an apparatus and a method for operating some of the CPUs of a multi-core system in the sleep mode to reduce power consumption, and more particularly it is related to an apparatus and a method for predicting how to properly operate the CPUs in the sleep mode based on historical performance.

Description of the Related Art

Efficient power management is a key requirement for any battery powered device. CPU-Idle is a dynamic power management technique presented in Linux. In CPU-Idle framework, prediction algorithms that are run by a governor decide on the appropriate idle state. The deeper the idle state, the more power it saves, but a deeper idle state leads to an extra cost in terms of entry/exit power (to enter and awaken from the sleep mode) and also longer latencies. Therefore, the optimal idle state should be determined for better power savings and better performance.

BRIEF SUMMARY OF THE INVENTION

In an embodiment, an apparatus comprises a plurality of CPUs, a CPU scheduler, an idle predictor, and a CPU-idle framework. The CPUs are categorized into a first group and a second group, and a specific CPU is in the first group. When the specific CPU is idle, the CPU scheduler issues an idle task. The idle predictor determines whether the CPUs in the first group corresponding to the specific CPU are going to operate the sleep mode in response to the idle task so as to schedule a sleep schedule of the CPUs in the first group operating in the sleep mode. The CPU-idle framework commands the CPUs in the first group to operate in the sleep mode based on the sleep schedule.

According to an embodiment of the invention, the idle predictor receives IPI information about the CPUs in the first group from the CPU scheduler. When the IPI information indicates that any of the CPUs in the first group has been scheduled, the idle predictor determines that the CPUs in the first group do not operate in the sleep mode in response to the idle task, and the CPU-idle framework does not command the CPUs in the first group to operate in the sleep mode based on the sleep schedule.

According to an embodiment of the invention, the idle predictor calculates a first algorithm to determine a cost efficiency of the CPUs in the first group operating in the sleep mode. The cost efficiency is a benefit-cost ratio.

According to an embodiment of the invention, the cost is power needed for the CPUs in the first group to enter and awaken from the sleep mode and the benefit is power saved by the CPUs in the first group operating in the sleep mode. When the cost efficiency exceeds a threshold, the idle predictor schedules the sleep schedule so that the CPUs in the first group operate in the sleep mode in response to the idle task. When the cost efficiency does not exceed the threshold, the CPU-idle framework keeps the CPUs in the first group in a normal mode in response to the idle task.

According to another embodiment of the invention, the cost is a period that is required for the CPUs in the first group to enter and awaken from the sleep mode and the benefit is a period that the CPUs in the first group are able to operate in the sleep mode. When the cost efficiency exceeds a threshold, the idle predictor schedules the sleep schedule so that the CPUs in the first group operate in the sleep mode in response to the idle task. When the cost efficiency does not exceed the threshold, the CPU-idle framework keeps the CPUs in the first group in a normal mode in response to the idle task.

According to another embodiment of the invention, the idle predictor further calculates a second algorithm to determine a cost of the specific CPU operating in a normal mode.

According to an embodiment of the invention, the idle predictor further compares the cost of the CPUs in the first group operating in the sleep mode and the cost of the specific CPU operating in the normal mode. When the cost of the CPUs in the first group operating in the sleep mode is less than the cost of the specific CPU operating in the normal mode, the idle predictor schedules the sleep schedule of the CPUs in the first group operating in the sleep mode. When the cost of the CPUs in the first group operating in the sleep mode is not less than the cost of the specific CPU operating in the normal mode, the idle predictor further determines whether the cost efficiency of the CPUs in the first group exceeds the threshold.

According to an embodiment of the invention, when the cost efficiency of the CPUs in the first group operating in the sleep mode exceeds the threshold, the idle predictor schedules the sleep schedule so that the CPUs in the first group operate in the sleep mode in response to the idle task. When the cost efficiency of the CPUs in the first group operating in the sleep mode does not exceed the threshold, the idle predictor schedules the sleep schedule so that the specific CPU keeps in the normal mode in response to the idle task.

According to another embodiment of the invention, the idle predictor further calculates a third algorithm to determine the cost efficiency of only the specific CPU operating in the sleep mode. The idle predictor compares the cost and the benefit of the CPUs in the first group operating in the sleep mode, the cost and benefit of only the specific CPU operating in the sleep mode, and the cost of the specific CPU remaining in the normal mode to schedule the sleep schedule.

According to an embodiment of the invention, when the cost of the CPUs in the first group operating in the sleep mode is less than the cost of the specific CPU operating in the normal mode, the idle predictor determines that the CPUs in the first group operate in the sleep mode in response to the idle task. When the cost of the CPUs in the first group operating in the sleep mode is not less than the cost of the specific CPU remaining in the normal mode, the idle predictor compares the cost efficiency of the CPUs in the first group operating in the sleep mode and the cost efficiency of only the specific CPU operating in the sleep mode. When the cost efficiency of the CPUs in the first group operating in the sleep mode exceeds the cost efficiency of only the specific CPU operating in the sleep mode, the idle predictor determines that the CPUs in the first group operate in the sleep mode in response to the idle task. When the cost efficiency of the CPUs in the first group operating in the sleep mode does not exceed the cost efficiency of only the specific CPU operating in the sleep mode, the idle predictor determines that only the specific CPU operates the sleep mode in response to the idle task.

According to an embodiment of the invention, the CPUs in the first group handle a first type of task, and the CPUs in the second group handle a second type of task. The first type and the second type are different. The specific CPU is able to be re-categorized from the first group to the second group by the CPU scheduler.

In another embodiment, a method for operating at least one of the CPUs in a sleep mode is provided. The CPUs are at least categorized into a first group and a second group, and a specific CPU is in the first group. The method comprises the following steps. When the specific CPU is idle, an idle task is issued. A decision is determined that whether the CPUs in the first group are going to operate in the sleep mode based on the idle task. The sleep schedule of the CPUs in the first group operating in the sleep mode is scheduled in response to the decision. The CPUs in the first group are operated in the sleep mode based on the sleep schedule in response to the idle task.

According to an embodiment of the invention, the step of determining the decision whether the CPUs in the first group are going to operate in the sleep mode further comprises the following steps. When any of the CPUs in the first group has been scheduled, the CPUs in the first group are maintained in a normal mode. When a cost efficiency of the CPUs in the first group operating in the sleep mode exceeds a threshold, it is determined that the CPUs in the first group operate in the sleep mode in response to the idle task. When the cost efficiency of the CPUs in the first group operating in the sleep mode does not exceed the threshold, it is determined to maintain the CPUs in the first group in a normal mode in response to the idle task.

According to an embodiment of the invention, the cost efficiency is a benefit-cost ratio. The cost is power needed for the CPUs in the first group to enter and awaken from the sleep mode. The benefit is power saved by the CPUs in the first group operating in the sleep mode.

According to another embodiment of the invention, the cost efficiency is a benefit-cost ratio. The cost is a period that is required for the CPUs in the first group to enter and awaken from the sleep mode. The benefit is a period that the CPUs in the first group are able to operate in the sleep mode.

According to an embodiment of the invention, the step of determining the decision whether the CPUs in the first group are going to operate in the sleep mode further comprises the following steps. A first algorithm is calculated to determine a cost and a benefit of the CPUs in the first group operating in the sleep mode. A second algorithm is calculated to determine a cost of the CPUs in the first group remaining in a normal mode. The cost and the benefit of the CPUs in the first group operating in the sleep mode and the cost of the specific CPU remaining in the normal mode are compared to determine the decision.

According to an embodiment of the invention, the step of comparing the cost and the benefit of the CPUs in the first group operating in the sleep mode and the cost of the specific CPU remaining in the normal mode to determine the decision comprises the following steps. When the cost of the CPUs in the first group operating in the sleep mode is less than the cost of the specific CPU operating in the normal mode, it is determined that the CPUs in the first group operate in the sleep mode in response to the idle task. When the cost of the CPUs in the first group operating in the sleep mode is not less the cost of the specific CPU operating in the normal mode, it is determined whether the cost efficiency of the CPUs in the first group exceeds a threshold. When the cost efficiency of the CPUs in the first group exceeds the threshold, it is determined that the CPUs in the first group operate in the sleep mode in response to the idle task. When the cost efficiency of the CPUs in the first group does not exceed the threshold, it is determined that the specific CPU stays in the normal mode in response to the idle task.

According to an embodiment of the invention, the step of determining the decision whether the CPUs in the first group are going to operate in the sleep mode further comprises the following steps. A third algorithm is calculated to determine a cost and a benefit of only the specific CPU operating in the sleep mode. The cost and the benefit of the CPUs in the first group operating in the sleep mode, the cost and benefit of only the specific CPU operating in the sleep mode, and the cost of the specific CPU remaining in the normal mode are compared to determine the decision.

According to an embodiment of the invention, the step of comparing the cost and the benefit of the CPUs in the first group operating in the sleep mode and the cost of the specific CPU remaining in the normal mode to determine the decision further comprises the following steps. When the cost of the CPUs in the first group operating in the sleep mode is less than the cost of the specific CPU operating in the normal mode, it is determined that the CPUs in the first group operate in the sleep mode in response to the idle task. When the cost of the CPUs in the first group operating in the sleep mode is not less than the cost of the specific CPU remaining in the normal mode, the cost efficiency of the CPUs in the first group operating in the sleep mode and the cost efficiency of only the specific CPU operating in the sleep mode are compared. When the cost efficiency of the CPUs in the first group operating in the sleep mode exceeds the cost efficiency of only the specific CPU operating in the sleep mode, it is determined that the CPUs in the first group operate in the sleep mode in response to the idle task. When the cost efficiency of the CPUs in the first group operating in the sleep mode does not exceed the cost efficiency of only the specific CPU operating in the sleep mode, it is determined that only the specific CPU operates in the sleep mode in response to the idle task.

According to an embodiment of the invention, an idle period of the CPUs in the first group and an idle period of the specific CPU are predicted based on IPI information about the CPUs in the first group. The idle period of the CPUs in the first group and the idle period of the specific CPU are configured to calculate the cost efficiency of the CPUs in the first group operating in the sleep mode and the cost efficiency of only the specific CPU operating in the sleep mode.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3A-3C illustrate different configurations of groups of CPUs in accordance with an embodiment of the invention.

DETAILED DESCRIPTION OF THE INVENTION

Figure 1:
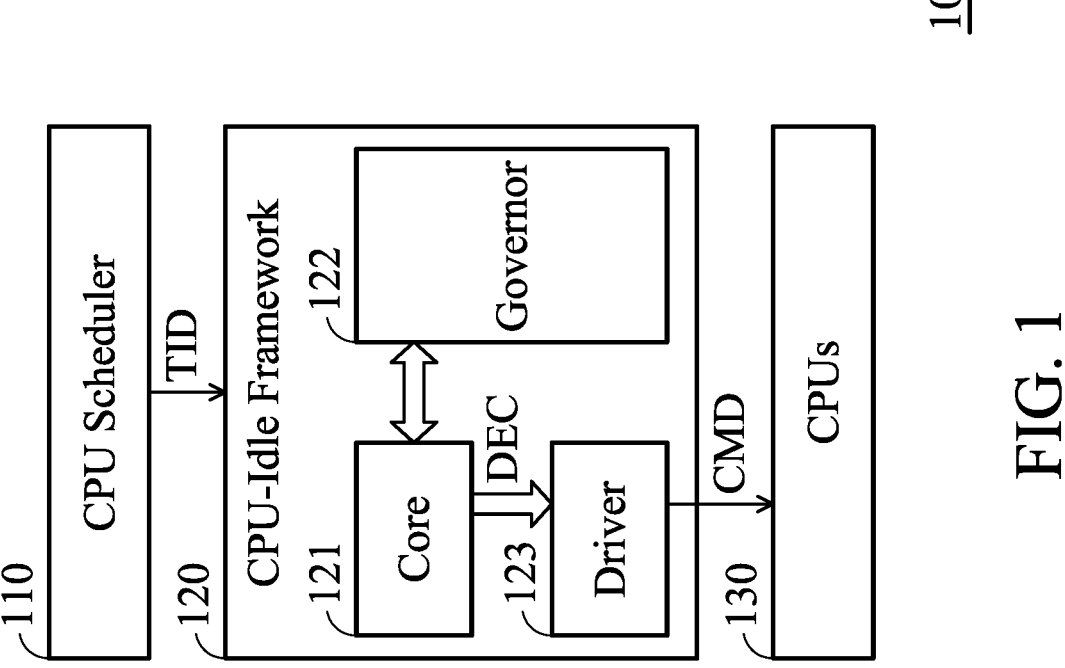
FIG. 1 is a block diagram of an apparatus in accordance with an embodiment of the invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In the drawings, similar elements and/or features may have the same reference number. Various components of the same type can be distinguished by adding letters or numbers after the component symbol to distinguish similar components and/or similar features.

FIG. 1 is a block diagram of an apparatus in accordance with an embodiment of the invention. As shown in FIG. 1, the apparatus 100 includes a CPU scheduler 110, a CPU-idle framework 120, and a plurality of CPUs 130. According to some embodiments of the invention, the CPU scheduler 110 and the CPU-idle framework 120 are software, and the CPUs 130 are hardware.

According to an embodiment of the invention, when a specific CPU in the CPUs 130 is idle, the CPU scheduler 110 issues an idle task TID to the CPU-idle framework 120. As shown in FIG. 1, the CPU-idle framework 120 includes a core 121, a governor 122, and a driver 123. When the core 121 receives the idle task TID, the core 121 requests the governor 122 to perform at least one algorithm to schedule the idle period that the specific CPU is going to be idle. Then, the core 121 transmits the sleep schedule DEC of the specific CPU scheduled by the governor 122 to the driver 123, so that the driver 123 operates the specific CPU in the sleep mode based on the sleep schedule DEC through the command CMD.

According to an embodiment of the invention, the governor 122 may perform the MENU algorithm built in Android to predict the idle period of the specific CPU so as to operate the specific CPU in the correct mode (i.e., the sleep mode, the normal mode, or others). According to another embodiment of the invention, the governor 122 may perform the qcom-cpu-lpm algorithm provided by Qaulcomm to predict the idle period of the specific CPU so as to operate the specific CPU in the correct mode (i.e., the sleep mode, the normal mode, or others).

However, it is difficult to predict the correct idle period of the specific CPU, and it is much difficult to choose a correct mode to operate the specific CPU based on the predicted idle period of the specific CPU. Thus, a more efficient method for operating the CPUs in the sleep mode is required.

Figure 2:
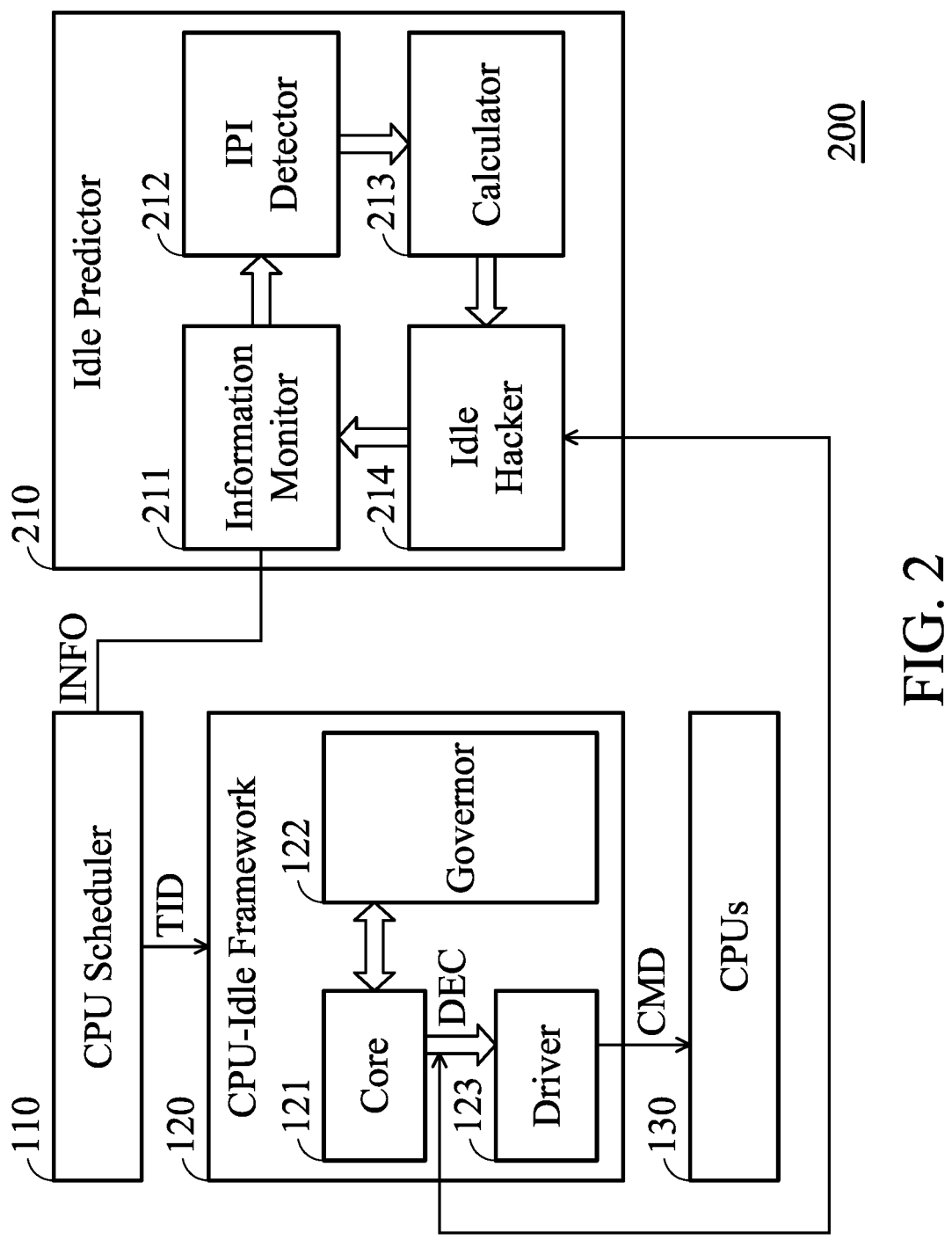
FIG. 2 is a block diagram of an apparatus in accordance with another embodiment of the invention.

FIG. 2 is a block diagram of an apparatus in accordance with another embodiment of the invention. As shown in FIG. 2, comparing the apparatus 200 to the apparatus 100 in FIG. 1, the apparatus 200 further includes the idle predictor 210. The idle predictor 210 includes an information monitor 211, an IPI detector 212, a calculator 213, and an idle hacker 214. According to an embodiment of the invention, the idle predictor 210 is software.

The idle hacker 214 intercepts the sleep schedule DEC that the core 121 provides to the driver 123. The information monitor 211 receives the sleep period and the CPU load of each CPU in the CPUs 130, and the IPI (inter-processor interrupt) information among the CPUs 130 from the CPU scheduler 110, and also receives the sleep schedule DEC that the core 121 provides to the driver 123. The IPI detector 212 detects whether the specific CPU that is idle has been scheduled based on the IPI information about the specific CPU. According to an embodiment of the invention, when the specific CPU has been scheduled afterward, the IPI detector 212 provides the information to the calculator 213 so as to keep the specific CPU in the normal mode.

According to another embodiment of the invention, when the IPI detector 212 determines, based on the IPI information, that the specific CPU is not scheduled for a predetermined period, the calculator 213 performs at least one algorithm to calculate the cost or the cost efficiencies of different schedules, and chooses the schedule having the lowest cost or the highest cost efficiency as the sleep schedule DEC. The idle hacker 214 then provides the sleep schedule DEC to the driver 123, so that the driver 123 operates the corresponding CPU in the sleep mode based on the sleep schedule DEC through the command CMD. According to an embodiment of the invention, the cost efficiency is defined as a ratio of the benefit to the cost.

According to an embodiment of the invention, the CPUs 130 are at least categorized into a first group and a second group, and the specific CPU is in the first group. According to other embodiments of the invention, the CPUs 130 may be categorized into any number of groups. The CPUs 130 is categorized into two groups are merely illustrated herein, but not intended to be limited thereto. The calculator 213 performs a first algorithm to determine the cost efficiency of the CPUs in the first group operating in the sleep mode. When the cost efficiency exceeds a threshold, the calculator 213 schedules the CPUs in the first group to operate in the sleep mode. When the cost efficiency does not exceed the threshold, the calculator 213 maintains the CPUs in the first group in the normal mode.

According to an embodiment of the invention, the cost efficiency is defined as the benefit-cost ratio. According to an embodiment of the invention, the cost is the power it takes for the CPUs in the first group to enter and awaken from the sleep mode, and the benefit is the power saved by the CPUs in the first group operating in the sleep mode. According to another embodiment of the invention, the cost is the period that is required for the CPUs in the first group to enter and awaken from the sleep mode, and the benefit is the period that the CPUs in the first group are able to operate in the sleep mode.

According to an embodiment of the invention, the IPI detector 212 determines the idle period of the CPUs in the first group based on the IPI information about the CPUs 130. The calculator 213 then calculates the cost efficiency of the CPUs in the first group operating in the sleep mode based on the idle period determined by the IPI detector 212.

According to another embodiment of the invention, the calculator 213 further uses a second algorithm to calculate the cost of the specific CPU operating in the normal mode. The calculator 213 further compares the cost of the CPUs in the first group operating in the sleep mode to the cost of the specific CPU operating in the normal mode.

When the cost of the CPUs in the first group operating in the sleep mode is less than the cost of the specific CPU operating in the normal mode, the calculator 213 schedules the sleep schedule DEC of the CPUs in the first group operating in the sleep mode. When the cost of the CPUs in the first group operating in the sleep mode is not less than the cost of the specific CPU operating in the normal mode, the calculator 213 further determines whether the cost efficiency of the CPUs in the first group exceeds the threshold.

When the cost efficiency of the CPUs in the first group operating in the sleep mode exceeds the threshold, the calculator 213 schedules the sleep schedule DEC to operate the CPUs in the first group in the sleep mode. When the cost efficiency of the CPUs in the first group operating in the sleep mode does not exceed the threshold, the calculator 213 schedules the sleep schedule to maintain the specific CPU in the normal mode.

According to another embodiment of the invention, the calculator 213 further performs a third algorithm to calculate the cost efficiency of only the specific CPU operating in the sleep mode. The calculator 213 also compares the cost and the benefit of the CPUs in the first group operating in the sleep mode, the cost and the benefit of only the specific CPU operating in the sleep mode, and the cost of the specific CPU remaining in the normal mode to determine the sleep schedule DEC.

When the cost of the CPUs in the first group operating in the sleep mode is less than the cost of the specific CPU operating in the normal mode, the calculator 213 schedules the CPUs in the first group to operate in the sleep mode. When the cost of the CPUs in the first group operating in the sleep mode is not less than the cost of the specific CPU remaining in the normal mode, the calculator 213 compares the cost efficiency of the CPUs in the first group operating in the sleep mode to the cost efficiency of only the specific CPU operating in the sleep mode.

When the cost efficiency of the CPUs in the first group operating in the sleep mode exceeds the cost efficiency of only the specific CPU operating in the sleep mode, the calculator 213 schedules the CPUs in the first group to operate in the sleep mode. When the cost efficiency of the CPUs in the first group operating in the sleep mode does not exceed the cost efficiency of only the specific CPU operating in the sleep mode, the calculator 213 schedules only the specific CPU to operate the sleep mode in response to the idle task. According to an embodiment of the invention, the IPI detector 212 determines the idle period of the specific CPU based on the IPI information about the CPUs 130. The calculator 213 then calculates the cost efficiency of the specific CPU operating in the sleep mode.

According to other embodiments of the invention, the calculator 213 uses any number of algorithms to calculate the corresponding cost efficiencies, and choose the most cost-effective way to operate the CPUs 130. According to other embodiments of the invention, the calculator 213 uses any kind of algorithm to determine the most cost-effective way to operate the CPUs 130. Only three algorithms are illustrated herein, but not intended to be limited thereto.

FIG. 3A-3C illustrate different configurations of groups of CPUs in accordance with an embodiment of the invention. As shown in FIG. 3A, the CPUs 130 in FIG. 2 are categorized into a first group CL1, a second group CL2, and a third group CL3. A first CPU A, a second CPU B, a third CPU C, and a fourth CPU D are in the first group CL1. A fifth CPU E, a sixth CPU F, and a seventh CPU G are in the second group CL2. An eighth CPU H is in the third group CL3. According to an embodiment of the invention, the CPUs 130 are categorized into the first group CL1, the second group CL2, and the third group CL3 by hardware group specification.

As shown in FIG. 3B, when the CPUs 130 are configured to execute critical and unimportant tasks, the second group CL2 and the third group CL3 in FIG. 3A are merged to be the second group CL2 in FIG. 3B. Namely, the eighth CPU H is merged into the second group CL2 to execute the critical tasks, and the CPUs in the first group CL1 are configured to execute the unimportant tasks.

As shown in FIG. 3C, when the CPUs 130 are classified for different functions, the fourth CPU D and the fifth CPU E are assigned to the second group CL2, and the sixth CPU F, the seventh CPU G, and the eighth CPU H are assigned to the third group CL3. The CPUs in the first group CL1 are configured to execute a first function, the CPUs in the second group CL2 are configured to execute the second function, and the CPUs in the third group CL3 are configured to execute the third function. The first function, the second function, and the third function are different to one another.

Referring to FIGS. 3A-3C, the CPUs 130 may be re-categorized into any number of groups for handling different types of tasks or functions. The CPUs 130 may be scheduled to operate in the sleep mode by group for the best power reduction. Only 8 CPUs and 3 groups are illustrated herein, but not intended to be limited thereto.

Figure 4:
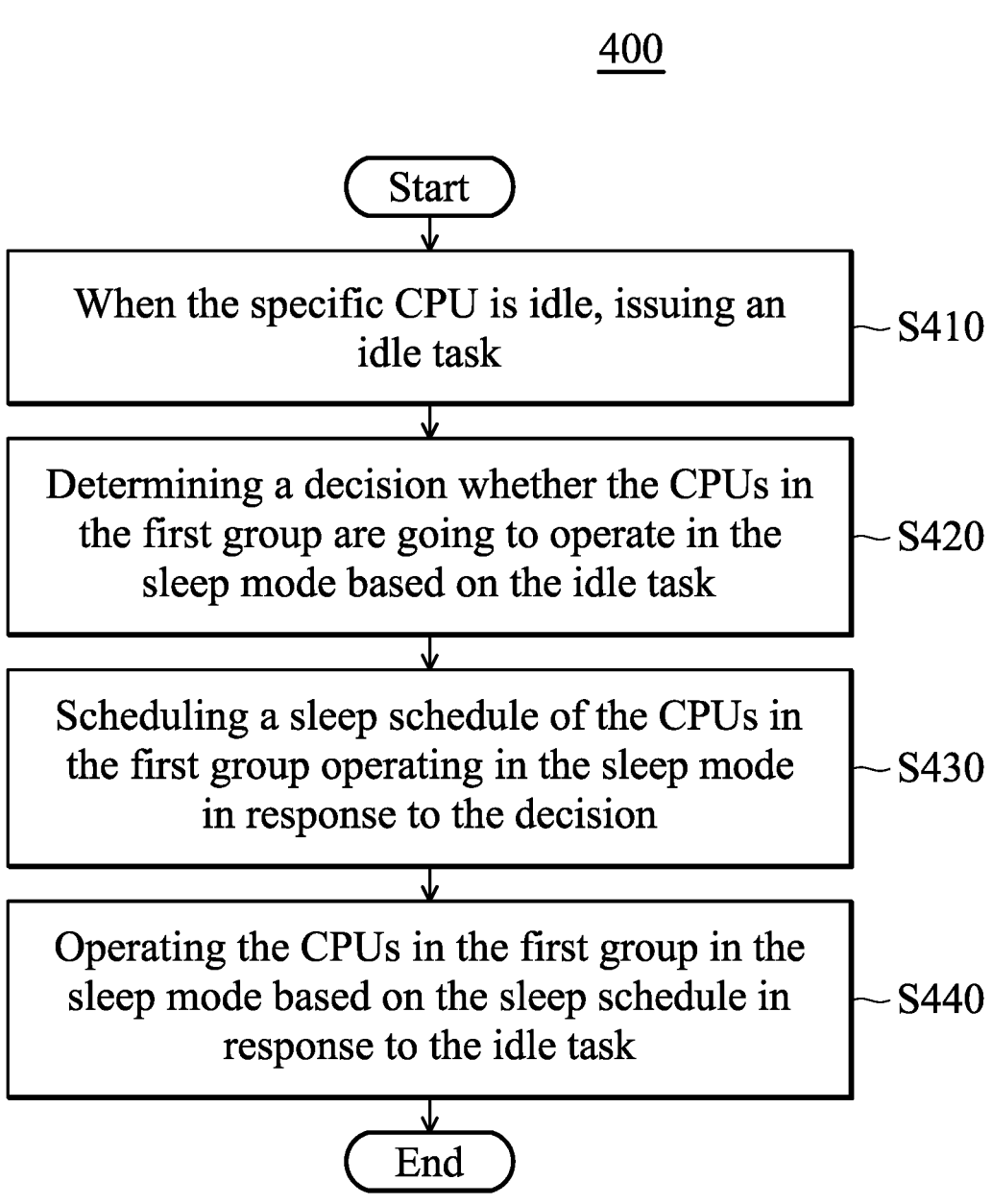
FIG. 4 is a flow chart of a method for operating at least one of the CPUs in a sleep mode in accordance with an embodiment of the invention.

FIG. 4 is a flow chart of a method for operating at least one of the CPUs in a sleep mode in accordance with an embodiment of the invention. In the following description to the method 400, FIG. 2 will be accompanied for the simplicity of explanation.

As shown in FIG. 4, when a specific CPU of the CPUs 130 is idle, an idle task TID is issued by the CPU scheduler 110 (Step S410). According to an embodiment of the invention, the CPUs 130 are at least categorized into a first group and a second group, and the specific CPU is in the first group.

It is determined, by the idle predictor 210, whether the CPUs in the first group are going to operate in the sleep mode based on the idle task TID (Step S420). When it is determined that the CPUs in the first group are going to operate in the sleep mode, a sleep schedule DEC of the CPUs in the first group operating in the sleep mode is scheduled by the idle predictor 210 (Step S430). Then, the CPUs in the first group are operated in the sleep mode based on the sleep schedule DEC in response to the idle task TID by the CPU-idle framework 120 (Step S440).

Apparatuses and methods for predicting the CPU(s) operating in the sleep mode based on historical performance are provided herein. The proposed apparatuses and methods compare the cost efficiency of each strategy to optimally operating the corresponding CPU(s) in the correct mode, so as to reduce power consumption and maintain the level of performance of the CPUs.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus, comprising:
a plurality of CPUs, wherein the CPUs are categorized into a first group and a second group and a specific CPU is in the first group;
a CPU scheduler, wherein when the specific CPU is idle, the CPU scheduler issues an idle task;
an idle predictor, determining whether the CPUs in the first group corresponding to the specific CPU are going to operate the sleep mode in response to the idle task so as to schedule a sleep schedule of the CPUs in the first group operating in the sleep mode; and
a CPU-idle framework, commanding the CPUs in the first group to operate in the sleep mode based on the sleep schedule,
wherein the idle predictor calculates a first algorithm to determine a cost efficiency of the CPUs in the first group operating in the sleep mode;
wherein the cost efficiency is a benefit-cost ratio;
wherein the idle predictor further calculates a second algorithm to determine a cost of the specific CPU operating in a normal mode;
wherein the idle predictor further calculates a third algorithm to determine the cost efficiency of only the specific CPU operating in the sleep mode; and
wherein the idle predictor compares the cost and the benefit of the CPUs in the first group operating in the sleep mode, the cost and benefit of only the specific CPU operating in the sleep mode, and the cost of the specific CPU remaining in the normal mode to schedule the sleep schedule.

2. The apparatus as defined in claim 1, wherein the idle predictor receives inter-processor interrupt (IPI) information about the CPUs in the first group from the CPU scheduler;
wherein when the IPI information indicates that any of the CPUs in the first group has been scheduled, the idle predictor determines that the CPUs in the first group do not operate in the sleep mode in response to the idle task, and the CPU-idle framework does not command the CPUs in the first group to operate in the sleep mode based on the sleep schedule.

3. The apparatus as defined in claim 1, wherein the cost is power needed for the CPUs in the first group to enter and awaken from the sleep mode and the benefit is power saved by the CPUs in the first group operating in the sleep mode;
wherein when the cost efficiency exceeds a threshold, the idle predictor schedules the sleep schedule so that the CPUs in the first group operate in the sleep mode in response to the idle task; and
wherein when the cost efficiency does not exceed the threshold, the CPU-idle framework keeps the CPUs in the first group in a normal mode in response to the idle task.

4. The apparatus as defined in claim 1, wherein the cost is a period that is required for the CPUs in the first group to enter and awaken from the sleep mode and the benefit is a period that the CPUs in the first group are able to operate in the sleep mode;
wherein when the cost efficiency exceeds a threshold, the idle predictor schedules the sleep schedule so that the CPUs in the first group operate in the sleep mode in response to the idle task; and
wherein when the cost efficiency does not exceed the threshold, the CPU-idle framework keeps the CPUs in the first group in a normal mode in response to the idle task.

5. The apparatus as defined in claim 1, wherein the idle predictor further compares the cost of the CPUs in the first group operating in the sleep mode and the cost of the specific CPU operating in the normal mode;

wherein when the cost of the CPUs in the first group operating in the sleep mode is less than the cost of the specific CPU operating in the normal mode, the idle predictor schedules the sleep schedule of the CPUs in the first group operating in the sleep mode; and wherein when the cost of the CPUs in the first group operating in the sleep mode is not less than the cost of the specific CPU operating in the normal mode, the idle predictor further determines whether the cost efficiency of the CPUs in the first group exceeds the threshold.

6. The apparatus as defined in claim 5, wherein when the cost efficiency of the CPUs in the first group operating in the sleep mode exceeds the threshold, the idle predictor schedules the sleep schedule so that the CPUs in the first group operate in the sleep mode in response to the idle task; and wherein when the cost efficiency of the CPUs in the first group operating in the sleep mode does not exceed the threshold, the idle predictor schedules the sleep schedule so that the specific CPU keeps in the normal mode in response to the idle task.

7. The apparatus as defined in claim 1, wherein when the cost of the CPUs in the first group operating in the sleep mode is less than the cost of the specific CPU operating in the normal mode, the idle predictor determines that the CPUs in the first group operate in the sleep mode in response to the idle task;

wherein when the cost of the CPUs in the first group operating in the sleep mode is not less than the cost of the specific CPU remaining in the normal mode, the idle predictor compares the cost efficiency of the CPUs in the first group operating in the sleep mode and the cost efficiency of only the specific CPU operating in the sleep mode;

wherein when the cost efficiency of the CPUs in the first group operating in the sleep mode exceeds the cost efficiency of only the specific CPU operating in the sleep mode, the idle predictor determines that the CPUs in the first group operate in the sleep mode in response to the idle task; and wherein when the cost efficiency of the CPUs in the first group operating in the sleep mode does not exceed the cost efficiency of only the specific CPU operating in the sleep mode, the idle predictor determines that only the specific CPU operates the sleep mode in response to the idle task.

8. The apparatus as defined in claim 1, wherein the CPUs in the first group handle a first type of task, and the CPUs in the second group handle a second type of task;

wherein the first type and the second type are different; and wherein the specific CPU is able to be re-categorized from the first group to the second group by the CPU scheduler.

9. A method for operating at least one of the CPUs in a sleep mode, wherein the CPUs are at least categorized into a first group and a second group, and a specific CPU is in the first group, wherein the method comprising:

when the specific CPU is idle, issuing an idle task;

determining a decision whether the CPUs in the first group are going to operate in the sleep mode based on the idle task;

scheduling a sleep schedule of the CPUs in the first group operating in the sleep mode in response to the decision; and operating the CPUs in the first group in the sleep mode based on the sleep schedule in response to the idle task;

wherein the step of determining the decision whether the CPUs in the first group are going to operate in the sleep mode further comprises:

calculating a first algorithm to determine a cost and a benefit of the CPUs in the first group operating in the sleep mode;

calculating a second algorithm to determine a cost of the CPUs in the first group remaining in a normal mode;

comparing the cost and the benefit of the CPUs in the first group operating in the sleep mode and the cost of the specific CPU remaining in the normal mode to determine the decision;

calculating a third algorithm to determine a cost and a benefit of only the specific CPU operating in the sleep mode; and comparing the cost and the benefit of the CPUs in the first group operating in the sleep mode, the cost and benefit of only the specific CPU operating in the sleep mode, and the cost of the specific CPU remaining in the normal mode to determine the decision;

wherein the step of comparing the cost and the benefit of the CPUs in the first group operating in the sleep mode and the cost of the specific CPU remaining in the normal mode to determine the decision further comprises:

when the cost of the CPUs in the first group operating in the sleep mode is less than the cost of the specific CPU operating in the normal mode, determining that the CPUs in the first group operate in the sleep mode in response to the idle task;

when the cost of the CPUs in the first group operating in the sleep mode is not less than the cost of the specific CPU remaining in the normal mode, comparing the cost efficiency of the CPUs in the first group operating in the sleep mode and the cost efficiency of only the specific CPU operating in the sleep mode;

when the cost efficiency of the CPUs in the first group operating in the sleep mode exceeds the cost efficiency of only the specific CPU operating in the sleep mode, determining that the CPUs in the first group operate in the sleep mode in response to the idle task; and when the cost efficiency of the CPUs in the first group operating in the sleep mode does not exceed the cost efficiency of only the specific CPU operating in the sleep mode, determining that only the specific CPU operates in the sleep mode in response to the idle task.

10. The method as defined in claim 9, wherein the step of determining the decision whether the CPUs in the first group are going to operate in the sleep mode further comprises:

when any of the CPUs in the first group has been scheduled, maintaining the CPUs in the first group in a normal mode;

when a cost efficiency of the CPUs in the first group operating in the sleep mode exceeds a threshold, determining that the CPUs in the first group operate in the sleep mode in response to the idle task; and when the cost efficiency of the CPUs in the first group operating in the sleep mode does not exceed the threshold, determining to maintain the CPUs in the first group in a normal mode in response to the idle task.

11. The method as defined in claim 10, wherein the cost efficiency is a benefit-cost ratio;

wherein the cost is power needed for the CPUs in the first group to enter and awaken from the sleep mode; and wherein the benefit is power saved by the CPUs in the first group operating in the sleep mode.

12. The method as defined in claim 10, wherein the cost efficiency is a benefit-cost ratio;

wherein the cost is a period that is required for the CPUs in the first group to enter and awaken from the sleep mode; and wherein the benefit is a period that the CPUs in the first group are able to operate in the sleep mode.

13. The method as defined in claim 9, wherein the step of comparing the cost and the benefit of the CPUs in the first group operating in the sleep mode and the cost of the specific CPU remaining in the normal mode to determine the decision further comprises:

when the cost of the CPUs in the first group operating in the sleep mode is less than the cost of the specific CPU operating in the normal mode, determining that the CPUs in the first group operate in the sleep mode in response to the idle task;

when the cost of the CPUs in the first group operating in the sleep mode is not less the cost of the specific CPU operating in the normal mode, determining whether the cost efficiency of the CPUs in the first group exceeds a threshold;

when the cost efficiency of the CPUs in the first group exceeds the threshold, determining that the CPUs in the first group operate in the sleep mode in response to the idle task; and when the cost efficiency of the CPUs in the first group does not exceed the threshold, determining that the specific CPU stays in the normal mode in response to the idle task.

14. The method as defined in claim 9, wherein an idle period of the CPUs in the first group and an idle period of the specific CPU are predicted based on IPI information about the CPUs in the first group; and wherein the idle period of the CPUs in the first group and the idle period of the specific CPU are configured to calculate the cost efficiency of the CPUs in the first group operating in the sleep mode and the cost efficiency of only the specific CPU operating in the sleep mode.

\* \* \* \* \*